United States Patent
Tang

(10) Patent No.: US 11,750,408 B2
(45) Date of Patent: Sep. 5, 2023

(54) METHOD AND APPARATUS FOR UPDATING UE POLICY, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 53 days.

(21) Appl. No.: 17/016,549

(22) Filed: Sep. 10, 2020

(65) Prior Publication Data
US 2020/0412559 A1    Dec. 31, 2020

Related U.S. Application Data

(63) Continuation of application No. PCT/CN2018/086049, filed on May 8, 2018.

(30) Foreign Application Priority Data

Mar. 12, 2018  (WO) ............... PCT/CN2018/078727
Apr. 12, 2018  (WO) ............... PCT/CN2018/082854
Apr. 28, 2018  (WO) ............... PCT/CN2018/085206

(51) Int. Cl.
*H04L 12/14* (2006.01)
*H04L 69/327* (2022.01)
*H04W 40/02* (2009.01)

(52) U.S. Cl.
CPC ........ *H04L 12/1407* (2013.01); *H04L 69/327* (2013.01); *H04W 40/02* (2013.01)

(58) Field of Classification Search
None
See application file for complete search history.

(56) References Cited

U.S. PATENT DOCUMENTS 10,531,420 B2 * 1/2020 Li .................... H04W 36/14
10,652,942 B2 * 5/2020 Castellanos Zamora ..................
                                              H04L 65/1016
(Continued)

FOREIGN PATENT DOCUMENTS

CN    104956736 A    9/2015
CN    107182098 A    9/2017
(Continued)

OTHER PUBLICATIONS

U.S. Appl. No. 62/476,701, filed Mar. 24, 2017, Mildh et al., "QoS Flows Inactivity Counters", corresponding to Mildh et al. (US20190394830) cited in Advisory Action dated Sep. 9, 2022.*
(Continued)

*Primary Examiner* — Gregory B Sefcheck
(74) *Attorney, Agent, or Firm* — PERKINS COIE LLP

(57) ABSTRACT

A method and apparatus for updating a User Equipment (UE) policy and a computer storage medium are provided. The method includes that: UE receives a first UE policy and/or first indication information from a network device; and the UE executes an operation of updating an association between an application data stream and a Protocol Data Unit (PDU) session and/or an operation of updating Wireless Local Area Network (WLAN) access selection and/or an operation of updating network slice information and/or an operation of updating a PDU session based on the first UE policy and/or the first indication information.

18 Claims, 8 Drawing Sheets

(56) References Cited

U.S. PATENT DOCUMENTS

| | | | |
|---|---|---|---|
| 10,664,338 B2* | 5/2020 | Karanan | G06Q 10/04 |
| 10,856,131 B2* | 12/2020 | Ryu | H04W 76/27 |
| 10,863,411 B2* | 12/2020 | Karimli | H04W 48/18 |
| 10,912,018 B2* | 2/2021 | Li | H04W 40/02 |
| 10,986,506 B2* | 4/2021 | Velev | H04W 48/18 |
| 10,999,787 B2* | 5/2021 | Dao | H04W 8/08 |
| 2015/0334644 A1 | 11/2015 | Kim et al. | |
| 2016/0330748 A1* | 11/2016 | Bindrim | H04W 12/02 |
| 2018/0077629 A1 | 3/2018 | Kim et al. | |
| 2018/0199398 A1* | 7/2018 | Dao | H04W 76/27 |
| 2018/0220405 A1 | 8/2018 | Feng et al. | |
| 2018/0227699 A1* | 8/2018 | Kim | H04W 8/02 |
| 2019/0098536 A1* | 3/2019 | Qiao | H04W 76/11 |
| 2019/0174449 A1* | 6/2019 | Shan | H04W 60/00 |
| 2019/0239280 A1* | 8/2019 | Li | H04W 76/25 |
| 2019/0253917 A1* | 8/2019 | Dao | H04W 28/0268 |
| 2019/0261449 A1* | 8/2019 | Kim | H04W 48/16 |
| 2019/0394830 A1* | 12/2019 | Mildh | H04W 52/0222 |
| 2020/0015138 A1* | 1/2020 | Zhu | H04W 36/0016 |
| 2020/0077356 A1* | 3/2020 | Youn | H04W 68/02 |
| 2020/0178196 A1* | 6/2020 | Wang | H04W 76/16 |
| 2020/0213912 A1* | 7/2020 | Shi | H04W 36/12 |
| 2021/0160186 A1* | 5/2021 | Xu | H04W 48/16 |

FOREIGN PATENT DOCUMENTS

| | | |
|---|---|---|
| CN | 107438245 A | 12/2017 |
| CN | 107592328 A | 1/2018 |
| JP | 2004096421 A | 3/2004 |
| KR | 20160126083 A | 11/2016 |
| KR | 20170109602 A | 9/2017 |
| WO | 2017045176 A1 | 3/2017 |

OTHER PUBLICATIONS

Nokia et al: "UE route selection policy and NAS", 3GPP Draft; C1-180331, vol. CT WG1, No. Gothenburg (Sweden); Jan. 22, 2018-Jan. 26, 2018 Jan. 15, 2018 (Jan. 15, 2018), XP051383421.
Sharp: "Pseudo-CR on generic UE configuration update", 3GPP Draft; C1-174902, vol. CT WG1, No. Reno (USA) Nov. 27, 2017-Dec. 1, 2017 Nov. 20, 2017 (Nov. 20, 2017), XPO51367539.
Cisco Systems et al: "System enablers for session and service continuity", 3GPP Draft; S2-162262_E-Mail_REV2_S2-162154. vol. SAWG2, No. Sophia Antipolis, France; Apr. 11, 2016-Apr. 15, 2016 Apr. 22, 2016 (Apr. 22, 2016), XP051091862.
Supplementary European Search Report in the European application No. 18909944.3, dated Mar. 18, 2021.
International Search Report in the international application No. PCT/CN2018/086049, dated Nov. 21, 2018.
International Search Report in the international application No. PCT/CN2018/078727, dated Nov. 28, 2018.
Motorola Mobility et al. "UE Policy Management (Discussion)" SA WG2 Meeting #124 S2-178546, Dec. 1, 2017 (Dec. 1, 2017), pp. 1-3.
Lenovo et al. "Definition of Access Network Discovery and Selection Policies" SA WG2 Meeting #123, S2-177169, Oct. 27, 2017 (Oct. 27, 2017), entire document.
Huawei et al. "UE Policy Delivery" 3GPP TSG-SA2 Meeting #125, S2-180320, Jan. 26, 2018 (Jan. 26, 2018), entire document.
Written Opinion and its English translation of the International Search Authority in the international application No. PCT/CN2018/086049, dated Nov. 21, 2018.
Written Opinion and its English translation of the International Search Authority in the international application No. PCT/CN2018/078727, dated Nov. 28, 2018.
3GPP TS 23.503 V15.1.0 (Mar. 2018), Policy and Charging Control Framework for the 5G System, Technical Specification Group Services and System Aspects, Stage 2 (Release 15).
Office Action of the Indian application No. 202027044120, dated Sep. 10, 2021. 6 pages with English translation.
First Office Action of the Canadian application No. 3093714, dated Sep. 17, 2021. 4 pages.
First Office Action of the Korean application No. 10-2020-7027611, dated May 10, 2022. 11 pages with English Translation.
Hearing Notice of the Indian application No. 202027044120, dated Apr. 6, 2022. 2 pages with English Translation.
Huawei et al, "UE selects a PDU Session based on URSP", 3GPP TSG-SA2 Meeting #126, S2-182626, Mar. 5, 2018. 5 pages.
Second Office Action of the Canadian application No. 3093714, dated May 26, 2022. 4 pages.
Sharp, "Pseudo-CR on extended usage of UE Configuration Update procedure", 3GPP TSG-CT WG1 Meeting #106, C1-174506, Oct. 27, 2017. 11 pages.
Subsequent Examination Report of the Indian application No. 202027044120, dated Mar. 10, 2022. 2 pages.
3rd Generation partnership Project; Technical Specification Group Services and System Aspects; Policy and Charging Control Framework for the 5G System; Stage2(Release 15),3GPP TS23.503 V15.0.0 (Dec. 22, 2017). 56 pages.
First Office Action of the European application No. 18909944.3, dated Dec. 13, 2021. 6 pages.
First Office Action of the Japanese application No. 2020-547413, dated Feb. 15, 2022. 13 pages with English translation.
First Office Action of the Chinese application No. 202011167396.0, dated Jun. 1, 2022. 14 pages with English Translation.
Second Office Action of the European application No. 18909944.3, dated Jun. 14, 2022. 6 pages.
Second Office Action of the Japanese application No. 2020-547413, dated Sep. 6, 2022. 10 pages with English translation.
Third Office Action of the European application No. 18909944.3, dated Oct. 26, 2022. 5 pages.
Notice of Allowance of the Korean application No. 10-2020-7027611, dated Nov. 18, 2022. 6 pages with English translation.

* cited by examiner

A network device sends a first UE policy and/or first indication information to UE to enable the UE to execute operation of updating an association between an application data stream and a PDU session and/or an operation of updating WLAN access selection and/or an operation of updating network slice information and/or an operation of updating a PDU session based on the first UE policy and/or the first indication information  501

FIG. 5

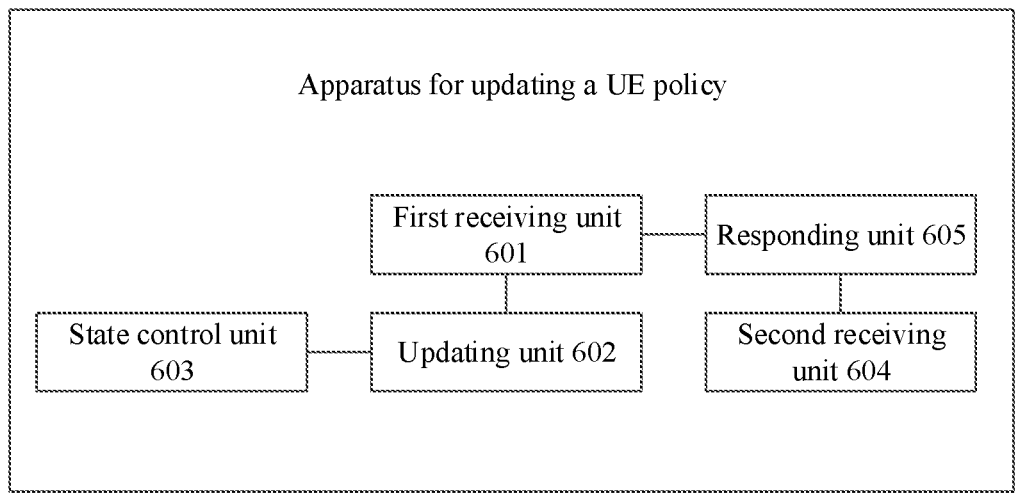

FIG. 6

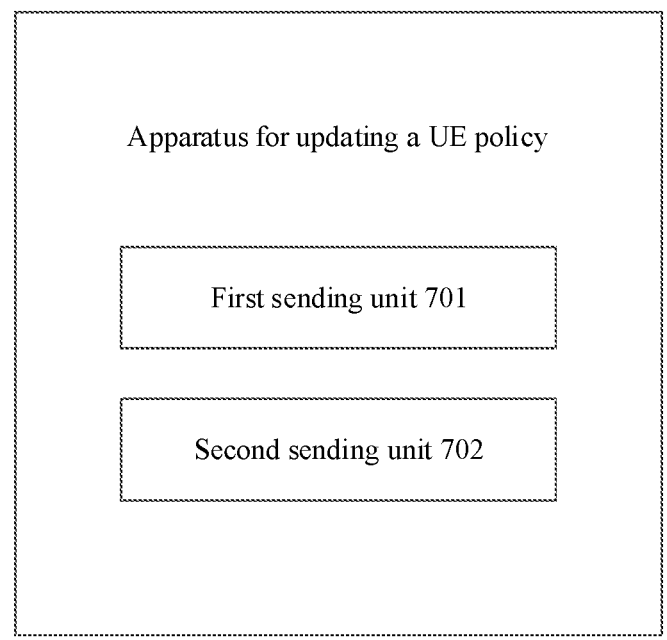

FIG. 7

METHOD AND APPARATUS FOR UPDATING UE POLICY, AND COMPUTER STORAGE MEDIUM

CROSS-REFERENCE TO RELATED APPLICATION

This application is a continuation of International Patent Application No. PCT/CN2018/086049, filed on May 8, 2018, which claimed priorities to PCT/CN2018/078727 filed on Mar. 12, 2018, to PCT/CN2018/082854 filed on Apr. 12, 2018 and to PCT/CN2018/085206 filed on Apr. 28, 2018, the entire contents of which are incorporated herein by reference for all purposes.

TECHNICAL FIELD

The disclosure relates to the technical field of wireless communication, and particularly to a method and apparatus for updating a User Equipment (UE) policy and a computer storage medium.

BACKGROUND

A UE policy includes a Wireless Local Area Network Selection Policy (WLANSP) and a UE Route Selection Policy (URSP). The WLANSP has a function of selecting a proper Wireless Local Area Network (WLAN) connection for UE to transmit data. The URSP has a function of applying for different network slices for different applications. The URSP, together with another policy, can establish and bind a specific Protocol Data Unit (PDU) session for a related application.

However, a UE policy is not constant. When the UE policy is updated, UE may be caused to have an unspecified action. How to ensure timely updating of a UE policy and service continuity is a problem to be solved.

SUMMARY

A first aspect of the disclosure provides a method for updating a UE policy, which is implemented by UE and may include the following operations of: receiving an updated UE Route Selection Policy (URSP) rule; determining an association between the updated URSP rule and an updated application data stream; and updating the association in any one of following manners: updating the association immediately; updating the association after UE enters an idle state; updating the association in certain time; updating the association or not based on whether a PDU session is in an active state; or updating the association based on a state of an application data stream in the updated USRP rule.

A second aspect of the disclosure provides a method for updating a UE policy, which is implemented by UE and may include the following operations. UE receives a first UE policy and/or first indication information from a network device. The UE executes an operation of updating an association between an application data stream and a PDU session and/or an operation of updating WLAN access selection and/or an operation of updating network slice information and/or an operation of updating a PDU session based on the first UE policy and/or the first indication information.

A third aspect of the disclosure provides a method for updating a UE policy, which is implemented by a network device and may include the following operations of: sending an updated UE Route Selection Policy (URSP) rule to UE to enable the UE to determine an association between the updated URSP rule and an updated application data stream and update the association in any one of following manners: updating the association immediately; updating the association after UE enters an idle state; updating the association in certain time; updating the association or not based on whether a PDU session is in an active state; or updating the association based on a state of an application data stream in the updated USRP rule.

A fourth aspect of the disclosure provides a method for updating a UE policy, which may include the following operation. A network device sends a first UE policy and/or first indication information to UE to enable the UE to execute an operation of updating an association between an application data stream and a PDU session and/or an operation of updating WLAN access selection and/or an operation of updating network slice information and/or an operation of updating a PDU session based on the first UE policy and/or the first indication information.

A fifth aspect of the disclosure provides an apparatus for updating a UE policy, which is applicable to UE and may include: a transmission device configured to receive an updated UE Route Selection Policy (URSP) rule; and a processor, connected to the transmission device, and configured to determine an association between the updated URSP rule and an updated application data stream and update the association in any one of following manners: updating the association immediately; updating the association after UE enters an idle state; updating the association in certain time; updating the association or not based on whether a PDU session is in an active state; or updating the association based on a state of an application data stream in the updated USRP rule.

A sixth aspect of the disclosure provides an apparatus for updating a UE policy, which is applicable to UE and may include a first receiving unit and an updating unit. The first receiving unit may be configured to receive a first UE policy and/or first indication information from a network device. The updating unit may be configured to execute an operation of updating an association between an application data stream and a PDU session and/or an operation of updating WLAN access selection and/or an operation of updating network slice information and/or an operation of updating a PDU session based on the first UE policy and/or the first indication information.

A seventh of the disclosure provides an apparatus for updating a UE policy, which may include a first sending unit. The first sending unit may be configured to send a first UE policy and/or first indication information to UE to enable the UE to execute an operation of updating an association between an application data stream and a PDU session and/or an operation of updating WLAN access selection and/or an operation of updating network slice information and/or an operation of updating a PDU session based on the first UE policy and/or the first indication information.

An eighth aspect of the disclosure provides an apparatus for updating a UE policy, which may include a transmission device. The transmission device is configured to send an updated UE Route Selection Policy (URSP) rule to UE to enable the UE to determine an association between the updated URSP rule and an updated application data stream and update the association in any one of following manners: updating the association immediately; updating the association after UE enters an idle state; updating the association in certain time; updating the association or not based on whether a PDU session is in an active state; or updating the association based on a state of an application data stream in the updated USRP rule.

A ninth aspect of the disclosure provides a non-transitory computer storage medium, in which computer-executable instructions may have been stored. The computer-executable instructions may be executed by a processor to implement the methods for updating a UE policy in the first, second, third or fourth aspect.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings:

FIG. 5 is a second flowchart of a method for updating a UE policy according to an embodiment of the disclosure.

FIG. 6 is a first structure composition diagram of an apparatus for updating a UE policy according to an embodiment of the disclosure.

FIG. 7 is a second structure composition diagram of an apparatus for updating a UE policy according to an embodiment of the disclosure.

DETAILED DESCRIPTION

In order to make the technical solutions of the embodiments of the disclosure convenient to be understood, technology related to the embodiments of the disclosure will be described below.

1) UE Policy

Figure 1:
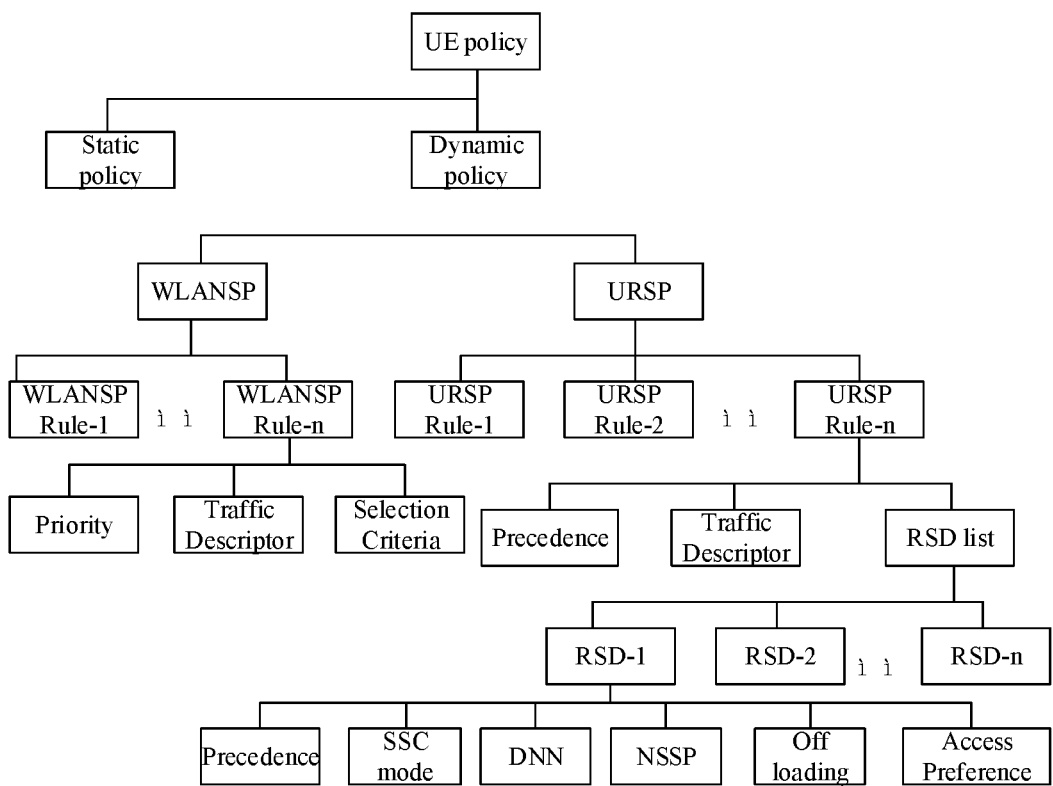
FIG. 1 is a composition architecture diagram of a UE policy.

As shown in FIG. 1, on one hand, the UE policy includes a static policy and a dynamic policy, and on the other hand, the UE policy includes a WLANSP and a URSP. NOTE: Network Slice Selection Policy (NSSP) and Data Network Name (DNN) in an RSD may have one or more values. Examples of the WLANSP and the URSP will be given below through codes respectively.

Example of the WLANSP
WLANSP rule 1:
  Priority 1
  Validity Conditions (PLMN 1)
  Group of Selection Criteria with priority 1:
    PreferredSSIDList=Priority 1: myoperator1, Priority 2: myoperator2
    MinimumBackhaulThreshold=2 Mbps in the downlink
  Group of Selection Criteria with priority 2
    PreferredSSIDList=Priority 1: myoperator3
WLANSP rule 2:
  Priority 2
  Validity Conditions (PLMN 1)
  Group of Selection Criteria with priority 1:
    PreferredRoamingPartnerList=Priority 1: partner1.com, Priority 2: partner2.com
    MaximumBSSLoad=60
Example of the URSP
URSP rule 1:
Priority:1
Traffic filter: App=DummyApp
Direct offload: Prohibited
Slice Info: S-NSSAI-a
Continuity Types: SSC Mode 3
DNNs: internet
Access Type: 3GPP access
URSP rule 2:
Priority:2
Traffic filter: App=App1, App2
Direct offload: Permitted
Slice Info: S-NSSAI-a
Access Type: Non-3GPP access Related contents are set for the URSP, as shown in Table 1 and Table 2. Table 1 describes a URSP rule, and Table 2 describes the RSD.

TABLE 1

| Information name | Description | Category | PCF allowed to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | This part defines the traffic descriptors for the policy | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |

TABLE 1-continued

| Information name | Description | Category | PCF allowed to modify in a UE context | Scope |
|---|---|---|---|---|
| Non-IP descriptors | Descriptor(s) for non-IP traffic | Optional | Yes | UE context |
| List of Route Selection Descriptors | A list of Route Selection Descriptors. The components of a Route Selection Descriptor are described in table 6.6.2-2. | Mandatory | | |

(NOTE 1):
Rules in a URSP shall have different precedence values.

TABLE 2

| Information name | Description | Category | PCF allowed to modify in a UE context | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either one single value or a list of values of S-NSSAI(s). | Optional | Yes | UE context |
| DNN Selection | Either one single value or a list of values of DNN(s). | Optional | Yes | UE context |
| Non-seamless Offload indication | Indicates if the traffic of the matching application is to be offloaded to non-3GPP access outside of a PDU Session. | Optional (NOTE 3) | Yes | UE context |
| Access Type preference | Indicates the preferred Access Type (3GPP or non-3GPP) when the UE establishes a PDU Session for the matching application. | Optional | Yes | UE context |

(NOTE 1):
Every Route Selection Descriptors in the list shall have a different precedence value.
(NOTE 2):
At least one of the route selection component shall be present.
(NOTE 3):
If this indication is present in a Route Selection Descriptor, no other components shall be included in the Route Selection Descriptor.

Part of the URSP is specified. This policy, together with other policies, can establish and bind a specific PDU session for a related application.

Figure 2:
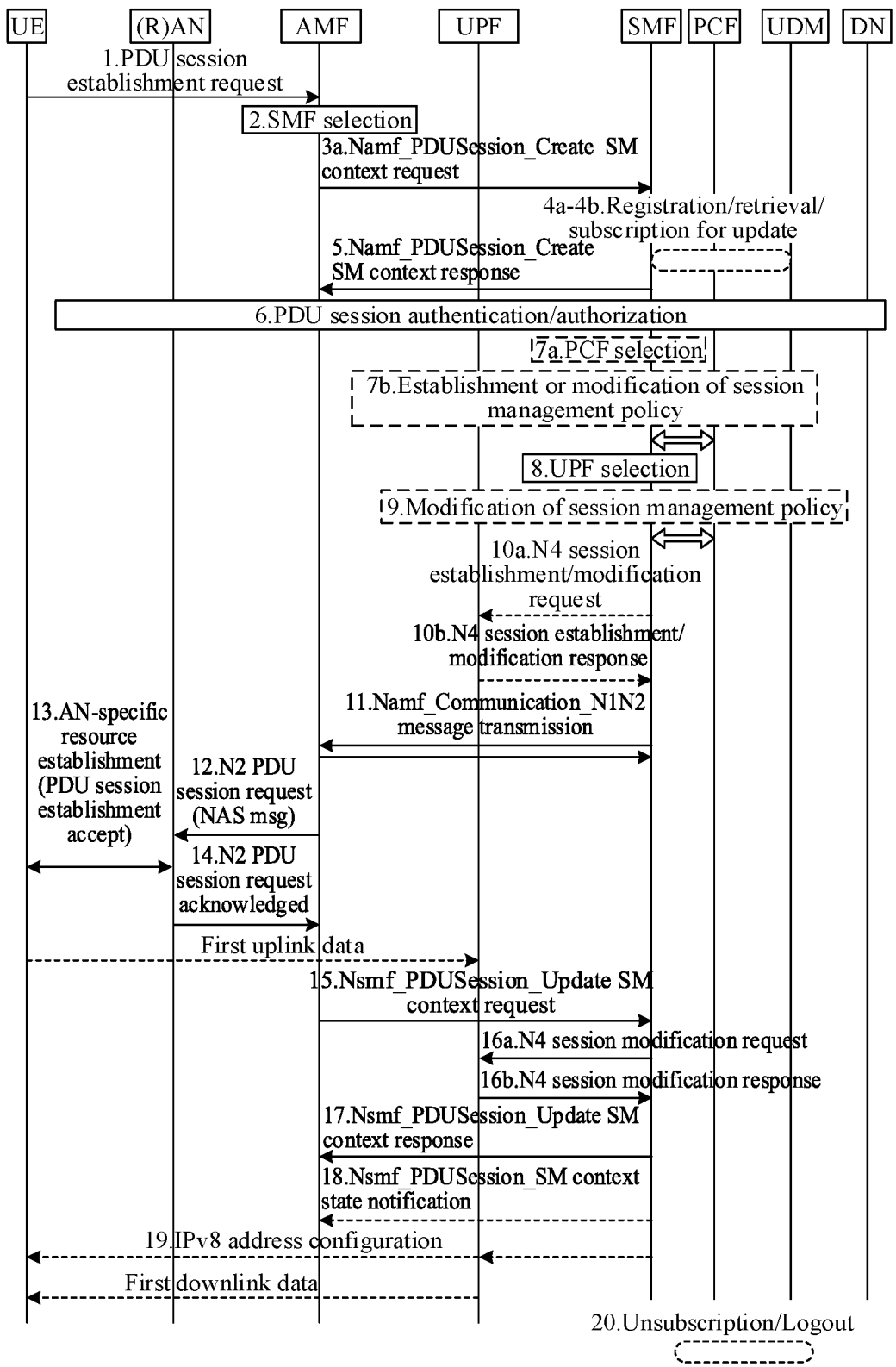
FIG. 2 is a flowchart of establishing a PDU session by a URSP.

A process of establishing a PDU session by the URSP is as shown in FIG. 2. UE is a user device, Radio Access Network (RAN) is a radio access network, Core Access and Mobility Management Function (AMF) is a core access and mobility management function, UPF is a user plane function, SMF is a session management function, PCF is a policy control function, Unified Data Management (UDM) is unified data management, and Data Network (DN) is a data network. In step 1, the UE may report Single Network Slice Selection Assistance Information (S-NSSAI), a DNN, an access type, a PDU session ID and the like to a network, and the network may establish a PDU session required for the UE. Every time when the network establishes a PDU session, the network may notify mapped Quality of Service (QoS) information of an Evolved Packet System (EPS) to the UE (including a EPS bearer ID and a mapped QoS parameter). When the UE is required to be handed over from a 5th-Generation (5G) network to a 4th-Generation (4G) network, the network side may perform mapping according to EPS QoS information transmitted to the UE before. Part of existing PDU sessions/flows may be merged to a default bearer, and part of PDU sessions/flows may be mapped to a dedicated bearer.

Figure 3:
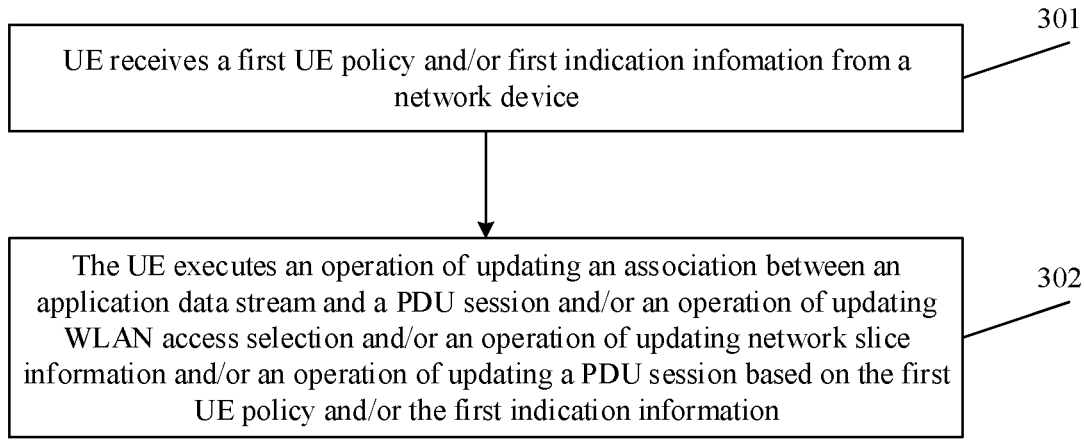
FIG. 3 is a first flowchart of a method for updating a UE policy according to an embodiment of the disclosure.

FIG. 3 is a first flowchart of a method for updating a UE policy according to an embodiment of the disclosure. As shown in FIG. 3, the method for updating a UE policy includes the following steps.

In step 301, UE receives a first UE policy and/or first indication information from a network device.

In the embodiments of the disclosure, the UE may be any device capable of communicating with a network device, such as a mobile phone, a tablet computer, a notebook computer and a desktop computer.

Figure 4:
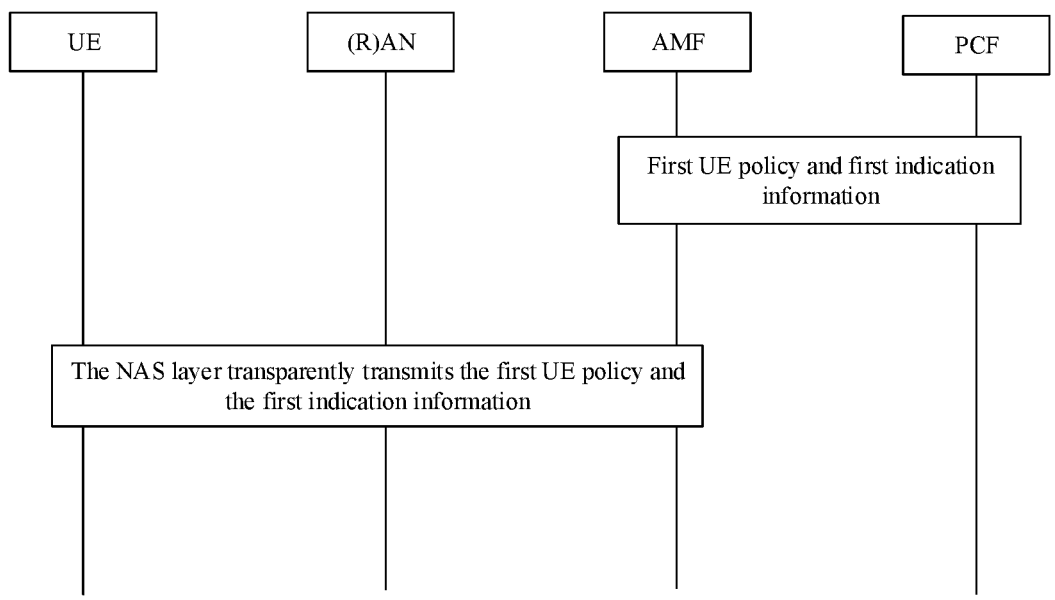
FIG. 4 is a flowchart of transmitting a first UE policy and first indication information according to an embodiment of the disclosure.

In the embodiments of the disclosure, the operation that the UE receives the first UE policy and/or the first indication information from the network device may be implemented through a flow shown in FIG. 4. Specifically, referring to FIG. 4, the following operations are executed.

In operation 1), a PCF sends the first UE policy and the first indication information to an AMF.

In operation 2), the AMF transparently transmits the first UE policy and the first indication information to UE through a RAN.

Herein, the first UE policy and the first indication information may be born through a NAS message. The first UE policy and the first indication information may be born through the same NAS message or through different NAS messages.

In the embodiments of the disclosure, in response to that a UE policy of the UE is updated, the UE may receive the first UE policy and/or the first indication information from the network device, the first UE policy being a UE policy to be updated.

The UE policy of the UE may be updated in the following two scenarios.

1) Under a condition that the UE is not handed over, the UE policy is updated.

2) Under a condition that the UE is handed over, the UE policy of the UE is updated. For example, when the UE is handed over from a 5G system to a 4G system, the UE policy of the UE is required to be updated from a UE policy corresponding to the 5G system to a UE policy corresponding to the 4G system.

In the embodiments of the disclosure, under a condition that the UE is executing a data service, since the UE policy is updated (updated to the first UE policy herein), the UE is required to execute an operation of updating an association between an application data stream and a PDU session and/or an operation of updating WLAN access selection and/or an operation of updating network slice information and/or an operation of updating a PDU session based on the first UE policy and/or the first indication information.

In the embodiments of the disclosure, the first indication information may include one indication parameter or include multiple indication parameters. Different indication parameters are configured to instruct the UE to execute the operation of updating the association between the application data stream and the PDU session and/or the operation of updating WLAN access selection and/or the operation of updating the network slice information and/or the operation of updating the PDU session.

In step 302, the UE executes an operation of updating an association between an application data stream and a PDU session and/or an operation of updating WLAN access selection and/or an operation of updating network slice information and/or an operation of updating a PDU session based on the first UE policy and/or the first indication information.

In an implementation mode, the first indication information may include a first indication parameter, and the first indication parameter is configured to instruct the UE to, after entering an idle state, execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a second indication parameter, and the second indication parameter is configured to instruct the UE to, after receiving the first indication information, immediately execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a third indication parameter, and the third indication parameter is configured to instruct the UE to, after receiving the first indication information, execute the operation of updating the association between the application data stream and the PDU session and/or the operation of updating WLAN access selection and/or the operation of updating the network slice information and/or the operation of updating the PDU session based on the first UE policy within a first duration.

Herein, the operation that the operation of updating the association between the application data stream and the PDU session and/or the operation of updating WLAN access selection are/is executed based on the first UE policy within the first duration may include the following operations.

1) In response to that the UE enters an idle state during the first duration, the operation of updating the association between the application data stream and the PDU session and/or the operation of updating WLAN access selection and/or the operation of updating the network slice information and/or the operation of updating the PDU session are/is executed based on the first UE policy.

2) In response to that the UE is in a connected state during the first duration, the operation of updating the association between the application data stream and the PDU session and/or the operation of updating WLAN access selection and/or the operation of updating the network slice information and/or the operation of updating the PDU session are/is executed based on the first UE policy.

Furthermore, 2.1) in response to that the UE is in the connected state during the first duration and is transmitting data, the UE stops transmitting the data and returns to the idle state from the connected state. 2.2) In response to that the UE is in the connected state during the first duration, the UE releases an RRC connection or a NAS connection under control of the network device to return to the idle state from the connected state.

In an implementation mode, the operation that the operation of updating the association between the application data stream and the PDU session is executed may include that: an original application data stream is bound to a PDU session matching with an updated rule, the updated rule being a rule in the first UE policy.

In an implementation mode, the first indication information may include a fourth indication parameter, and the fourth indication parameter is configured to instruct the UE to, responsive to determining based on the first UE policy that a PDU session presently used for a traffic descriptor in a URSP rule is in an inactive state (namely a data stream corresponding to the present traffic descriptor does not appear in the existing PDU session), execute an operation of updating an association between the application data stream corresponding to the traffic descriptor and the PDU session. The PDU session being in the inactive state refers to that no data is transmitted through the PDU session and/or a radio resource is released.

Furthermore, the operation that the operation of updating the association between the application data stream corresponding to the traffic descriptor and the PDU session is executed may include that: a new PDU session is established or a modification is initiated for an existing PDU session, and the application data stream corresponding to the traffic descriptor is bound to the new or modified PDU session.

In an implementation mode, the first indication information may include a fifth indication parameter, and the fifth indication parameter is configured to instruct the UE to determine a state of a first application data stream in the URSP rule based on the first UE policy and execute an operation of updating an association between the first application data stream and a PDU session and/or the operation of updating the network slice information and/or the operation of updating the PDU session based on the state of the first application data stream.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream is the inactive state, the operation of updating the association between the first application data stream and the PDU session and/or the operation of updating the network slice information and/or the operation of updating the PDU session are/is executed. The state of the first application data stream being the inactive state refers to that the first application data stream includes no data packet or only includes a heartbeat packet at present or in a period of time.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream indicates that a rate of the first application data stream is less than or equal to a first threshold, the operation of updating the association between the first application data stream and the PDU session and/or the operation of updating the network slice information and/or the operation of updating the PDU session are/is executed.

In the embodiments of the disclosure, different indication parameters correspond to different priority information; when the first indication information includes at least two indication parameters, whether an execution condition corresponding to an indication parameter with highest priority is satisfied or satisfied within a second duration is determined. If the execution condition corresponding to the indication parameter with highest priority is satisfied or satisfied within the second duration, the operation of updating the association between the application data stream and the PDU session and/or the operation of updating WLAN access selection and/or the operation of updating the network slice information and/or the operation of updating the PDU session are/is executed based on the indication parameter with the highest priority. if not satisfied, whether an execution condition corresponding to the indication parameter with second highest priority is satisfied or satisfied within the second duration is determined, and if the execution condition corresponding to the indication parameter with second highest priority is satisfied or satisfied within the second duration, the operation of updating the association between the application data stream and the PDU session and/or the operation of updating WLAN access selection and/or the operation of updating the network slice information and/or the operation of updating the PDU session are/is executed based on the indication parameter with second highest priority.

In the embodiments of the disclosure, the operation that the operation of updating the association between the application data stream and the PDU session and/or the operation of updating WLAN access selection are/is executed based on the first UE policy may be implemented through the following manners.

A first manner is that: based on the first UE policy, a present first PDU session for the application data stream may be modified to a second PDU session satisfying a target condition, and the application data stream may be born in the second PDU session; and/or, based on the first UE policy, a present first WLAN connection of the UE may be modified to a second WLAN connection satisfying the target condition, and a data stream of the first WLAN connection may be born through the second WLAN connection.

A second manner is that: based on the first UE policy, the second PDU session satisfying the target condition may be established for the application data stream, and the application data stream may be born in the second PDU session; and/or, based on the first UE policy, the second WLAN connection satisfying the target condition may be established for the UE, and the data stream of the first WLAN connection may be born through the second WLAN connection.

Herein, after the application data stream is born in the second PDU session, the original first PDU session for the application data stream may be deleted; and/or, after the data stream of the first WLAN connection is born through the second WLAN connection, the first WLAN connection may be deleted.

In the embodiments of the disclosure, the first indication information may include one or more of the abovementioned indication parameters. The first indication information in the embodiments of the disclosure will be described below in combination with specific application examples, as shown in Table 3.

TABLE 3

| Value of the indication parameter | Specific action |
|---|---|
| 10 | Instructing the UE to rebind the application data stream after entering the idle state |
| 20 | Instructing the UE to immediately rebind the application data stream (the manner is not limited) |
| 21 | Instructing the UE to immediately rebind the application data stream and modify the present PDU session |
| 22 | Instructing the UE to immediately rebind the application data stream in a "establish before disconnect" manner |
| 30 | Rebinding the application data stream in specified time (the manner is not limited) |

TABLE 3-continued

| Value of the indication parameter | Specific action |
|---|---|
| 31 | The UE performs updating in certain time, and the UE directly stops sending data and returns to the idle state |
| 32 | The UE performs updating in certain time, and the network side forcibly releases the RRC connection to enable the UE to return to the idle state |
| 33 | The UE binds the original application data stream to the PDU session matching with the new rule in certain time |
| 40 | The UE respectively rebinds the data stream of the URSP rule according to the activation condition of the present PDU session |
| 50 | Instructing the UE to rebind the application data stream described in the URSP rule according to the state of the application data stream |
| 51 | When the specified application data stream is in the "inactive" state, namely the application data stream includes no data packet or only includes the heartbeat packet at present or in a period of time, the application data stream is rebound |
| 52 | When the state of the specified application data stream indicates that the present flow rate is lower than a certain threshold, the application data stream is rebound |

Under a condition that a value of the indication parameter is 10: the UE is required to rebind the application data stream after entering the idle state. The UE, after entering the idle state, may modify an existing PDU session or establish a new PDU session according to the new URSP and subsequently associates the application data stream with a PDU session matching with the condition.

Under a condition that the value of the indication parameter is 20: the application data stream is required to be rebond immediately, and any manner can be adopted.

Under a condition that the value of the indication parameter is 21: the application data stream is required to be rebound immediately, and the UE may immediately modify an existing PDU session according to a new URSP and associate the application data stream with a PDU session matching with the condition.

Under a condition that the value of the indication parameter is 22: the application data stream is required to be rebound immediately, and the UE may initiate establishment of a new PDU session according to a new URSP, bind data in an original PDU session to a new PDU session after establishment is completed, and optionally delete the original PDU session after binding is completed.

Under a condition that the value of the indication parameter is 30: the UE may perform updating in certain time, updating may be triggered in response to that the UE enters an idle state within certain time, and when the time is exceeded, updating may be still required even though the UE is in the connected state.

Under a condition that the value of the indication parameter is 31: the UE may perform updating in certain time, and the UE may directly stop sending the data and return to the idle state to trigger updating.

Under a condition that the value of the indication parameter is 32: the UE may perform updating in certain time, and the network side may forcibly release a RRC connection to enable the UE to return to the idle state to trigger updating.

Under a condition that the value of the indication parameter is 33: the UE may associate an original application data stream with a PDU session matching with a new rule in certain time.

Under a condition that the value of the indication parameter is 40: When a PDU session presently used for a traffic descriptor in an updated URSP rule is in the inactive state, the UE may establish a new PDU session or initiates a modification for the existing PDU session (the PDU session is modified according to the updated URSP rule) and associate data of the traffic descriptor with the new or modified PDU session. Herein, the PDU session being in the inactive state refers to that no data is transmitted and/or the radio resource is released.

Under a condition that the value of the indication parameter is 50: the UE may be instructed to rebind the application data stream described in the URSP rule according to the state thereof. Herein, the state of the application data stream may be the "inactive" state, namely the application data stream includes no data packet or only includes the heartbeat packet at present or in the period of time, and the application data stream may be rebound. Or, the state of the application data stream is that a present flow rate is lower than a certain threshold, and the application data stream is rebound.

Under a condition that the value of the indication parameter is 51: a present state of the specified application data stream is the "inactive" state, namely the application data stream includes no data packet or only includes a heartbeat packet at present or in the period of time, and the application data stream is rebound.

Under a condition that the value of the indication parameter is 52: the present state of the specified application data stream indicates that the present flow rate is lower than the certain threshold, and the application data stream is rebound.

In an implementation mode, in response to that the UE does not receive the first indication information, the UE may determine a target indication parameter based on first information and execute an updating operation corresponding to the target indication parameter.

The target indication parameter may be one of the first indication parameter in the first indication information, the second indication parameter in the first indication information, the third indication parameter in the first indication information, the fourth indication parameter in the first indication information and the fifth indication parameter in the first indication information.

For example, When the UE determines based on default configuration information that the target indication parameter is the first indication parameter in the first indication information, the operation that the UE executes the updating operation corresponding to the target indication parameter may include that: the UE, after entering the idle state, executes the operation of updating the association between the application data stream and the PDU session and/or the operation of updating WLAN access selection and/or the operation of updating the network slice information and/or the operation of updating the PDU session based on the first UE policy.

For another example, when the UE determines based on the default configuration information that the target indication parameter is the second indication parameter in the first indication information, the operation that the UE executes the updating operation corresponding to the target indication parameter may include that: the UE, after receiving the first indication information, immediately executes the operation of updating the association between the application data stream and the PDU session and/or the operation of updating WLAN access selection and/or the operation of updating the network slice information and/or the operation of updating the PDU session based on the first UE policy.

For another example, when the UE determines based on the default configuration information that the target indication parameter is the third indication parameter in the first indication information, the operation that the UE executes the updating operation corresponding to the target indication parameter may include that: the UE, after receiving the first indication information, executes the operation of updating the association between the application data stream and the PDU session and/or the operation of updating WLAN access selection and/or the operation of updating the network slice information and/or the operation of updating the PDU session based on the first UE policy during the first duration.

As to the situation that configuration is default, the UE may conduct an action corresponding to a certain indication parameter when the URSP and/or WLANSP rule includes a specific parameter value and conduct an action corresponding to an indication parameter configured by default under another condition.

For example, when the URSP rule contains a parameter "WLAN access preferred", the UE may execute the updating operation corresponding to the second indication parameter. Under another condition, namely when the parameter value "WLAN access preferred" is not contained, the UE may determine based on the default configuration information that the target indication parameter is the first indication parameter and execute a corresponding updating operation.

Herein, the operation that the operation of updating the association between the application data stream and the PDU session and/or the operation of updating WLAN access selection are/is executed based on the first UE policy within the first duration may include the following operations.

In response to that the UE enters an idle state during the first duration, the operation of updating the association between the application data stream and the PDU session and/or the operation of updating WLAN access selection and/or the operation of updating the network slice information and/or the operation of updating the PDU session are/is executed based on the first UE policy.

In response to that the UE is in the connected state during the first duration, the operation of updating the association between the application data stream and the PDU session and/or the operation of updating WLAN access selection and/or the operation of updating the network slice information and/or the operation of updating the PDU session are/is executed based on the first UE policy.

For another example, when the UE determines based on the default configuration information that the target indication parameter is the fourth indication parameter in the first indication information, the operation that the UE executes the updating operation corresponding to the target indication parameter may include that: the UE, responsive to determining based on the first UE policy that the PDU session presently used for the traffic descriptor in the URSP rule is in the inactive state, executes the operation of updating the association between the application data stream corresponding to the traffic descriptor and the PDU session. The PDU session being in the inactive state refers to that no data is transmitted through the PDU session and/or the radio resource is released.

For another example, When the UE determines based on the default configuration information that the target indication parameter is the fifth indication parameter in the first indication information, the operation that the UE executes the updating operation corresponding to the target indication parameter may include that: the state of the first application data stream in the URSP rule is determined based on the first UE policy, and the operation of updating the association between the first application data stream and the PDU session and/or the operation of updating the network slice information and/or the operation of updating the PDU session are/is executed based on the state of the first application data stream.

In the embodiment of the disclosure, indication parameters in the first indication information may be different based on different PSIs; or, indication parameters in the first indication information may be different based on different URSP rules; or, indication parameters in the first indication information may be different based on different ANDSP rules; or, indication parameters in the first indication information may be different based on different RSDs.

For example, for a PSI-1 policy, the UE is required to bind a data stream immediately after updating. For a PSI-2 policy, the data stream may be rebound after the UE enters the idle state after updating.

In the embodiments of the disclosure, When a PSI or RSD or URSP or first UE policy received by a first receiving unit contains the target indication parameter, the updating operation corresponding to the target indication parameter may be executed. When the PSI or RSD or URSP or first UE policy received by the first receiving unit does not contain the target indication parameter, an updating operation corresponding to a default indication parameter may be executed. The default indication parameter may be one of the first indication parameter, the second indication parameter, the third indication parameter, the fourth indication parameter and the fifth indication parameter. In other words, When the first indication information does not contain the abovementioned indication parameters, the UE may execute an action corresponding to any abovementioned indication parameter by default. For example, when some PSIs or URSPs contain indication parameters, the rebinding operation may be executed according to actions corresponding to the contained indication parameters. For a PSI or URSP containing no indication parameter, a default updating action may be executed (for example, binding is performed after returning to the idle state).

For example, Table 4 describes the URSP rule. A parameter (configured to describe the indication parameters above) is added to the URSP. When the URSP rule does not contain the parameter, the default updating operation may be executed by the default indication parameter (for example, binding is performed after returning to the idle state). Like the URSP, a new parameter may also be added to the PSI or the RSD to indicate how to execute the updating operation, or a parameter may be added to the whole policy transmitted to the UE to indicate how to execute the updating operation.

Besides an explicit updating action (based on the newly added indication parameter) or the updating action configured by default (based on the default indication parameter), an implicit updating operation may also be used, namely the UE policy may be divided into multiple parts, different parts have different serial numbers, and different serial number ranges correspond to different updating actions. The updating actions corresponding to different value ranges may have been preconfigured in the UE.

Specifically, the first UE policy may be divided into multiple parts, different parts have different serial numbers, different serial number ranges correspond to different indication parameters, and the UE may store a corresponding relationship between a serial number range and an indication parameter. After the UE receives a first rule in the first UE policy, an indication parameter corresponding to the first rule can be determined based on a serial number of the first rule and the stored corresponding relationship between a serial number range and an indication parameter, and a corresponding updating operation can be executed.

For example, the UE policy may be divided into multiple parts by the PSI, and different serial numbers may correspond to different actions, as follows.

PSIs 1-5: an action corresponding to the first indication parameter is executed.

PSIs 6-10: an action corresponding to the second indication parameter is executed.

Others: an action corresponding to the third indication parameter is executed.

In the embodiments of the disclosure, when the UE does not have a new rule ID at present, the new rule ID and a content corresponding to the new rule ID are added. When a rule ID presently stored in the UE is as same as the new rule ID and a new rule corresponding to the new rule ID includes a specific content, the stored rule ID and a content corresponding to the stored rule ID are replaced. When the rule ID presently stored in the UE is as same as the new rule ID and the new rule only includes the new rule ID, the stored rule ID and the content corresponding to the stored rule ID are deleted.

In the embodiments of the disclosure, in a process of updating with the first UE policy, for a replaced UE policy, an updating operation may be executed according to an indication parameter corresponding to the replaced UE policy, or an updating operation is executed according to an indication parameter corresponding to a newly released UE policy. The replaced UE policy refers to a UE policy that has been locally stored but is deleted due to updating with the first UE policy.

In the embodiments of the disclosure, in the process of updating with the first UE policy, the replaced UE policy may be changed from an original UE policy to a new UE policy, a traffic descriptor of the original UE policy correspond to a first range and a traffic descriptor of the new UE policy correspond to a second range, and an updating operation may be executed for an application data stream corresponding to an overlapping range of the first range and the second range based on the new UE policy or the original UE policy.

In the embodiments of the disclosure, after the UE stores the first UE policy, the UE may bind the application data stream by a first RSD under a first rule and/or a first WLANSP rule. In response to the UE subsequently determines that a second URSP rule satisfying a specified condition and/or a second RSD under a first URSP rule and/or a second WLANSP rule are/is available, the UE may determine timing of executing a following operation according to the indication parameter in the first indication information: binding an application data stream described by a traffic descriptor corresponding to the second URSP rule satisfying the specified condition and/or the second RSD under the first URSP rule and/or the second WLANSP rule to the second URSP rule satisfying the specified condition and/or the second RSD under the first URSP rule and/or the second WLANSP rule. Specifically, the UE may determine a policy updating action immediately upon receiving the first indication parameter, and in addition, after the UE policy is configured in the UE, if the UE subsequently finds that a better existing URSP/WLAN rule is available, the UE may also determine how to associate an application data stream described by a traffic descriptor corresponding with the better rule to the new better URSP/WLAN rule according to the indication parameter in the first indication information.

Specifically, for example, a descriptor of a certain application data stream is in URSP rule 1, and priority of RSD1 of the URSP rule 1 is higher than that of RSD2. When the UE fails in establishment of PDU session 1 generated based on the RSD1 of the URSP rule 1 at a first time (or place), the UE may continue to execute establishment of PDU session 2 based on the RSD2 of the URSP rule 1. If the UE succeeds in establishing the PDU session 2, the UE may associate the application data stream with the PDU session 2. Then, when the UE is at a second time (or place), if the UE successfully establishes the PDU session 1 generated based on the rule 1, the UE is required to associate the application data stream with the PDU session 1. A specific binding action can be executed according to the indication parameter corresponding to the URSP rule 1.

In the updating process, for a replaced UE policy, a session binding action of an updated policy may also be executed according to an indication parameter corresponding to an original updated policy rather than according to an indication parameter corresponding to a newly released policy.

TABLE 4

| Information name | Description | Category | PCF allowed to modify in a UE context | Scope | Value |
|---|---|---|---|---|---|
| Rule Precedence | Determines the order the URSP rule is enforced in the UE. | Mandatory (NOTE 1) | Yes | UE context | |
| Valid action indication parameter | If the rule is available, when it is validated to bind the service corresponding to the traffic descriptor is determined | Optional/ Mandatory | Yes | UE context | Action corresponding to the Xx value |

TABLE 4-continued

| Information name | Description | Category | PCF allowed to modify in a UE context | Scope | Value |
|---|---|---|---|---|---|
| Traffic descriptor | This part defines the traffic descriptors for the policy | | | | |
| Application identifiers | Application identifier(s) | Optional | Yes | UE context | |
| IP descriptors | IP 3 tuple(s) (destination IP address or IPv6 network prefix, destination port number, protocol ID of the protocol above IP) | Optional | Yes | UE context | |
| Non-IP descriptors | Descriptor(s) for non-IP traffic | Optional | Yes | UE context | |
| List of Route Selection Descriptors | A list of Route Selection Descriptors. The components of a Route Selection Descriptor are described in table 6.6.2-2. | Mandatory | | | |

(NOTE 1):
Rules in a URSP shall have different precedence values.

In an embodiment, the PCF may store URSP/WLANSP rules corresponding to the present PDU session. When rule updating is required, updating may be not triggered for a URSP/WLANSP rule corresponding to an active PDU session, and updating may be triggered for another rule required to be updated.

Herein, the PCF may acquire the URSP/WLANSP rule corresponding to the PDU session through the following method including that:

every time when a PDU session is established and/or in an active/inactive state, an SMF notifies the PCF of the state of the present PDU session;

the PCF transmits an application detection event to the SMF/UPF according to a URSP and/or WLANSP rule to detect a specific application; when the URSP/WLANSP rule is required to be updated, the PCF checks whether a report about detection for the specific application is received from the SMF/UPF; if not received (namely there is no data stream of the specific application in the present PDU session and the application is in the inactive state), the PCF releases an update; otherwise, if received, the update is temporally not transmitted, and after the SMF/UPF reports that the application data stream is stopped or a certain period exceeds, the PCF releases a corresponding rule; and the PCF may also obtain a state of the specific application through a notification message from a third-party Over The Top (OTT) server to determine whether to update the URSP rule and/or the WLANSP rule.

In the embodiments of the disclosure, an indication parameter may be added to subscription information or policy information, and the indication parameter is configured to indicate an action of the UE after the UE receives an updated URSP rule and/or WLANSP rule. The action may refer to immediately performing association updating, or performing association updating when the PDU session is not in an active state, or performing association updating in certain time.

In the embodiments of the disclosure, when the UE receives the updated URSP rule and/or WLANSP rule, whether an impacted service data stream is presently in a PDU session through which data is being transmitted is determined, and if the impacted service data stream is presently in a PDU session through which data is being transmitted, the UE may determine an indication parameter corresponding to the PDU session and may determine timing for association updating based on the indication parameter.

In an implementation mode, "an association policy parameter" (i.e., an indication parameter) may be introduced to the subscription information or the policy information (i.e., rule information), and the parameter can indicate actions of the UE after the updated URSP rule and/or WLANSP rule are/is received. The action may include the following action:

1) immediately performing association updating; or,
2) performing association updating when the PDU session is not in the active state (all related radio bearers of radio data are released); or,
3) performing association updating within certain time.

Figure 13:
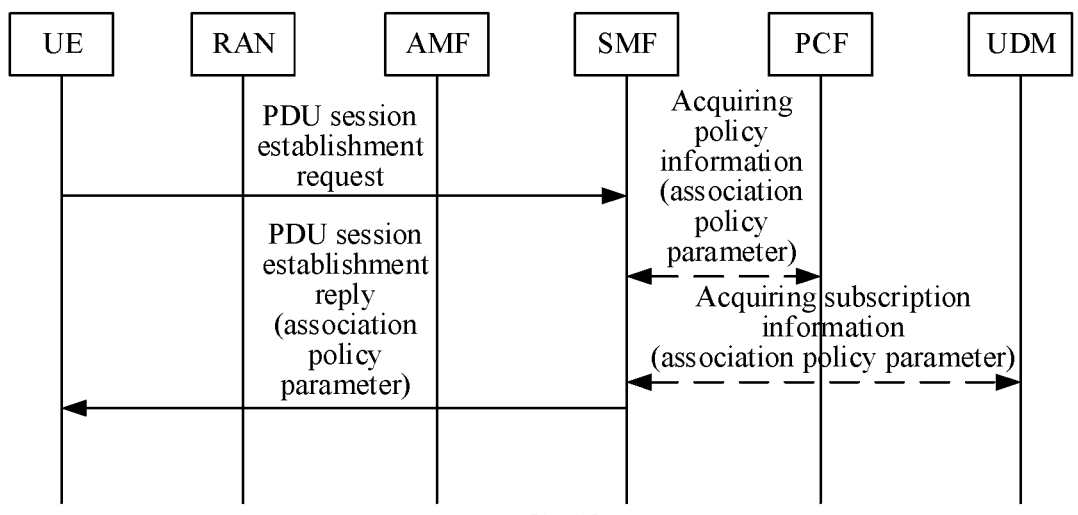
FIG. 13 is a schematic diagram of transmitting an association policy parameter according to an embodiment of the disclosure.

As shown in FIG. 13, when the UE initiates PDU session establishment, a core network may add the "association policy parameter" to a reply message. The parameter may be obtained when the subscription information is acquired between the SMF and UDM, or may be obtained when the policy information is acquired between the SMF and the PCF.

When the new URSP rule and/or the WLANSP rule are/is sent to the UE, the UE may determine whether data of an impacted data stream is being transmitted through a PDU session, and if YES, the UE may determine a value of the "association policy parameter" of the PDU session and determine when to initiate association updating according to the value.

In the embodiments of the disclosure, the operation that the operation of updating the association between the application data stream and the PDU session and/or the operation of updating WLAN access selection and/or the operation of updating the network slice information and/or the operation of updating the PDU session are/is executed may include the following operations.

When the application data stream is being transmitted, the operation of updating the association between the application data stream and the PDU session and/or the operation of updating WLAN access selection and/or the operation of updating the network slice information and/or the operation of updating the PDU session are/is not executed.

After transmission of the application data stream is ended, the operation of updating the association between the application data stream and the PDU session and/or the operation of updating WLAN access selection and/or the operation of updating the network slice information and/or the operation of updating the PDU session are/is executed when transmission is started next time.

Herein, the updating operation may be applied to the first indication parameter and the fourth indication parameter.

In an implementation mode, the method further may include the following operations.

The UE receives second indication information from the network device.

The UE determines whether to send a response to the first UE policy to the network device based on the second indication information.

For example, the UE determines based on the second indication information that it is needed to send a response to the first UE policy to the network device, and when the UE correctly receives the first UE policy and the first indication information, the UE may send an ACK message to the network device; and when the UE does not correctly receive the first UE policy and the first indication information, the UE may send a Negative Acknowledgement (NACK) message to the network device, and then the network device may retransmit the data.

In the embodiments of the disclosure, the network slice information may be NSSAI. The NSSAI can be divided into the following three types.

1: Requested NSSAI

The information may be transmitted in a registration request of the UE, and is configured for the UE to apply for specific S-NSSAI, and meanwhile, a RAN may also send a NAS message of the UE to a specific AMF (AMF supporting the requested NSSAI) according to the information.

2: Subscribed NSSAI

The subscribed NSSAI is NSSAI subscribed by the network side for a user. When the subscribed NSSAI of the user is changed, the UDM may notify the AMF to trigger the AMF to update an NSSAI configuration of the UE (UE Configuration Update (UCU), which will be introduced below in combination with FIG. 4).

3: Allowed NSSAI

The AMF judges which NSSAI may be allowed to be used according to the NSSAI requested by the UE in the registration request and sends the allowed NSSAI to the UE in a registration accept message. The UE subsequently carries a piece of S-NSSAI in the allowed NSSAI in a PDU session establishment request message to establish a PDU session.

Figure 9:
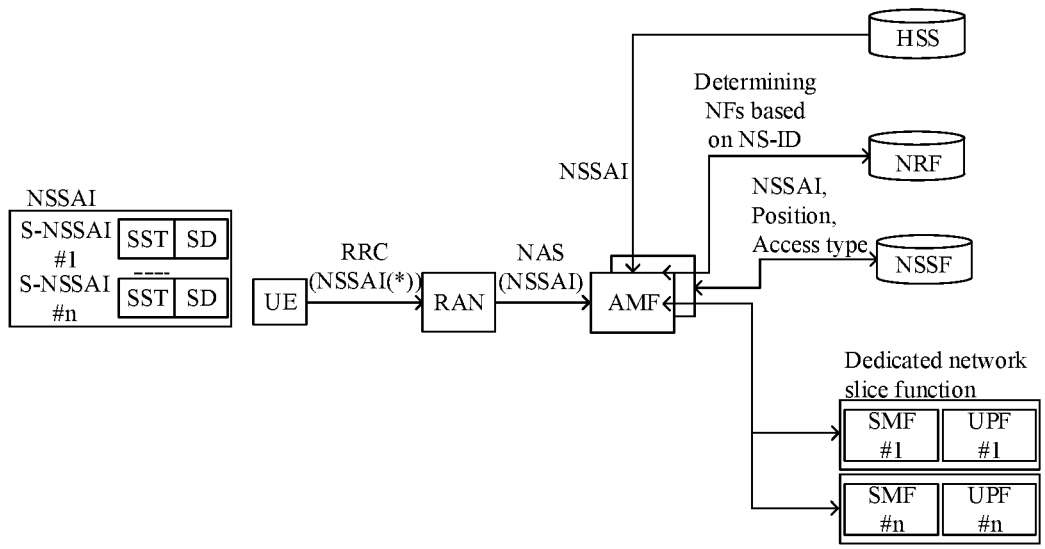
FIG. 9 is a schematic diagram of transmission of Network Slice Selection Assistance Information (NSSAI) in a network according to an embodiment of the disclosure.
Figure 10:
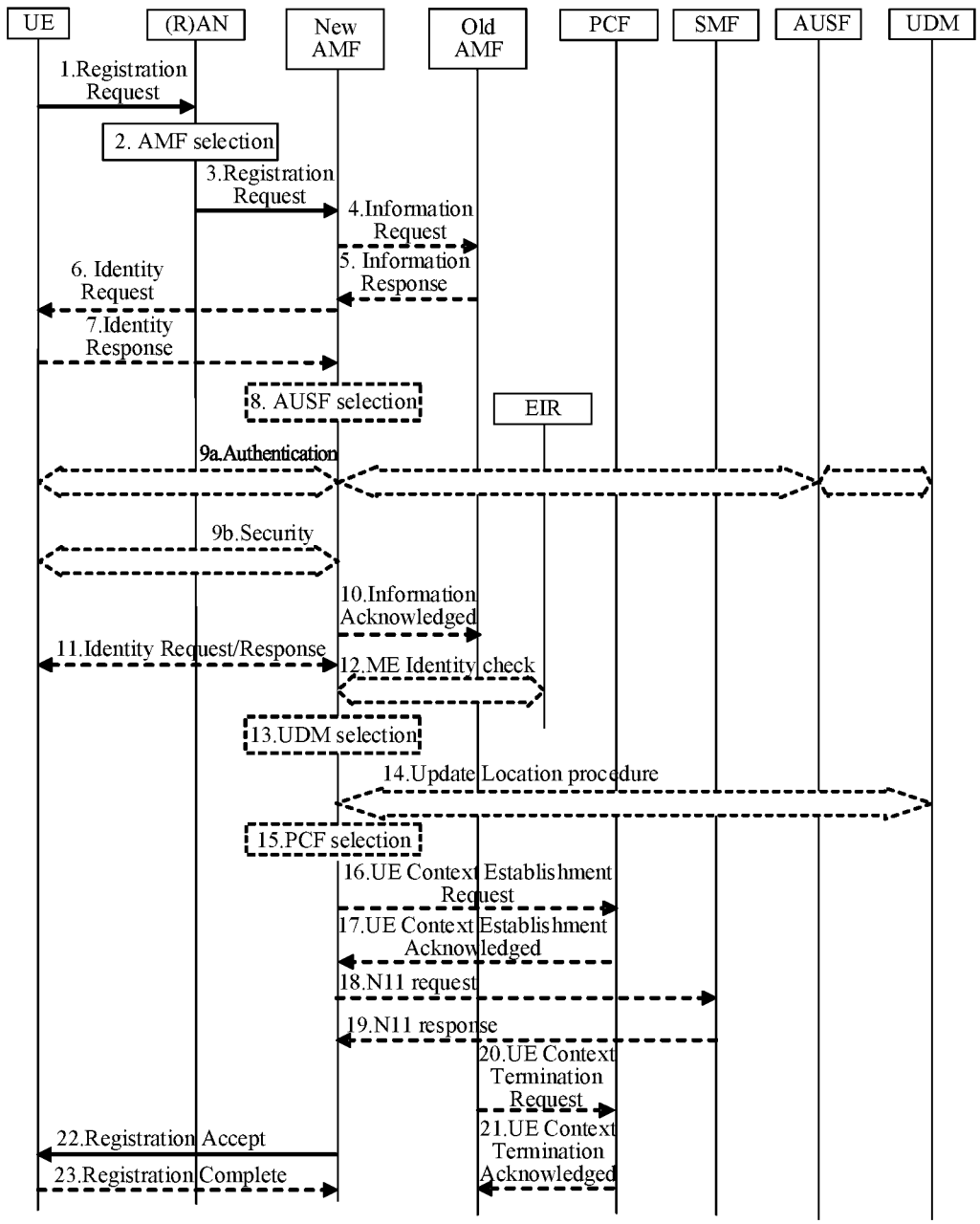
FIG. 10 is a flowchart of registering UE on a network according to an embodiment of the disclosure.
Figure 11:
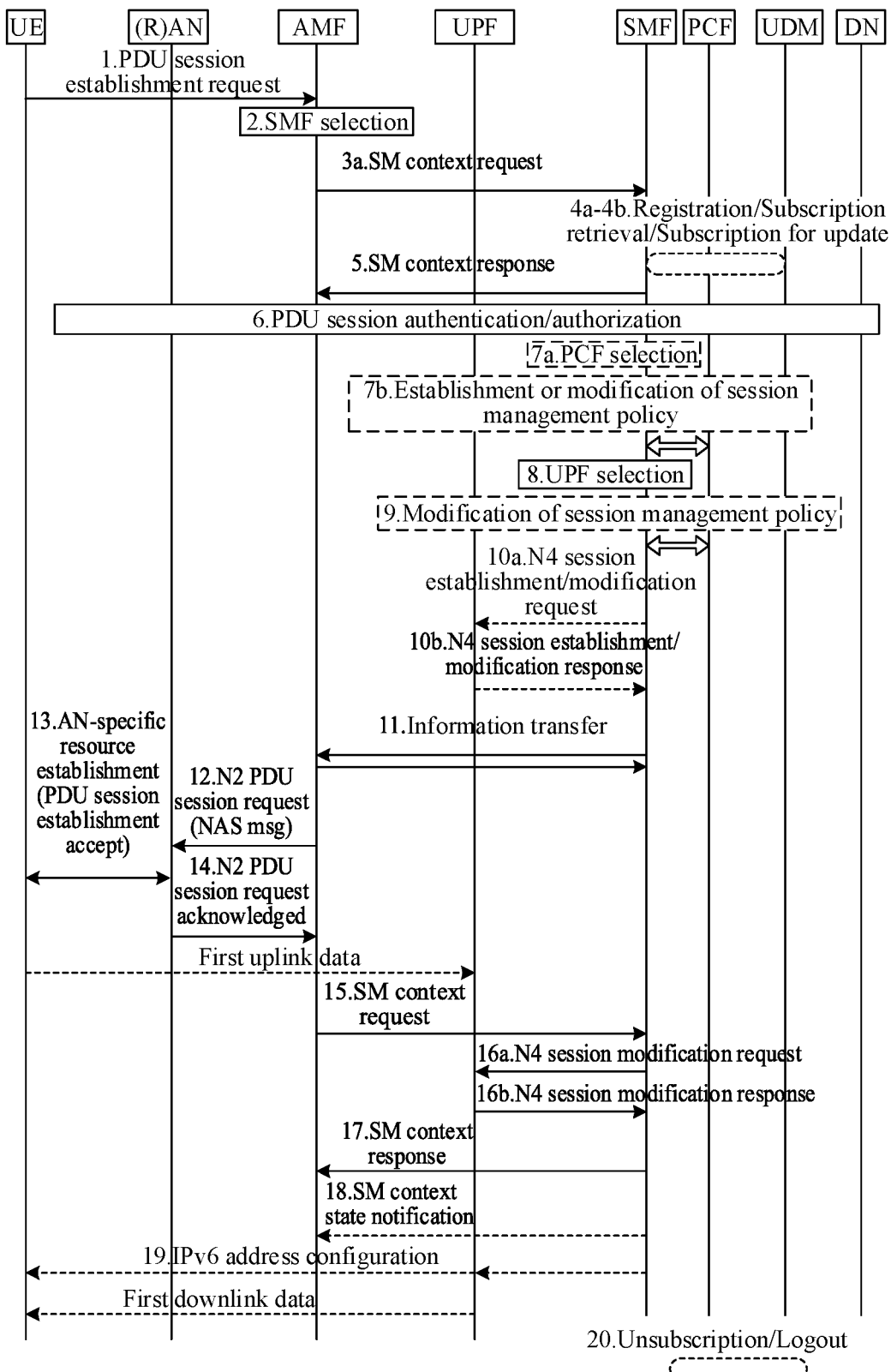
FIG. 11 is a flowchart of establishing a PDU session according to an embodiment of the disclosure.

Referring to FIG. 9, FIG. 10 and FIG. 11. FIG. 9 is a schematic diagram of transmission of NSSAI in a network according to an embodiment of the disclosure. FIG. 10 is a flowchart of registering UE on a network according to an embodiment of the disclosure. FIG. 11 is a flowchart of establishing a PDU session according to an embodiment of the disclosure. In a 5G network, the UE may conduct a related 5G service only after registering on the 5G network through a registration flow. The UE may send a requested NSSAI to a RAN and a AMF through a registration request, the AMF may send the requested NSSAI to a Network Slice Selection Function (NSSF) to acquire allowed NSSAI, and the AMF may send the allowed NSSAI to the UE through a registration accept message.

Figure 12:
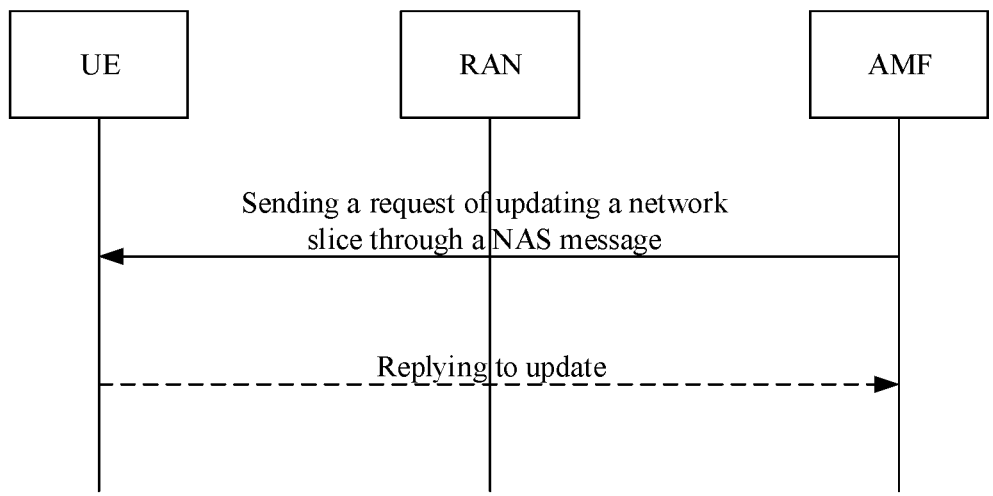
FIG. 12 is a flowchart of updating network slice information according to an embodiment of the disclosure.

The UE may subsequently carry S-NSSAI (one of the allowed NSSAI) in the PDU session request message, the AMF of the network side may query the NSSF about a Network Slice Instance (NSI)-ID according to the S-NSSAI carried by the UE, then the AMF may send the returned NSI-ID to a Network Repository Function (NRF), the NRF may return SMF network element information corresponding to the NSI-ID to the AMF, and the AMF may find a SMF network element according to the SMF network element information and generate a PDU session. As shown in FIG. 10, the registration request message in the registration flow may include the requested NSSAI and registration type=initial/update/emergency. As shown in FIG. 11, in step 1, the UE may report information of the S-NSSAI, a DNN, an access type and the PDU session to the network side. In addition, a flow of configuring the network slice information may refer to FIG. 12. The AMF may send a network slice update request message to the UE through a NAS message, and the UE may send an update reply message to the AMF.

FIG. 5 is a second flowchart of a method for updating a UE policy according to an embodiment of the disclosure. As shown in FIG. 5, the method for updating a UE policy includes the following step.

In step 501, a network device sends a first UE policy and/or first indication information to UE to enable the UE to execute an operation of updating an association between an application data stream and a PDU session and/or an operation of updating WLAN access selection and/or an operation of updating network slice information and/or an operation of updating a PDU session based on the first UE policy and/or the first indication information.

In the embodiments of the disclosure, in response to that a UE policy of the UE is updated, the network device may send the first UE policy and the first indication information to the UE, the first UE policy being a UE policy to be updated.

In an implementation mode, in response to that the UE is handed over, the UE policy of the UE may be updated.

In an implementation mode, the first indication information may include a first indication parameter, and the first indication parameter is configured to instruct the UE to, after entering an idle state, execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a second indication parameter, and the second indication parameter is configured to instruct the UE to, after receiving the first indication information, immediately execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a third indication parameter, and the third indication parameter is configured to instruct the UE to, after receiving the first indication information, execute the operation of updating the association between the application data stream and the PDU session and/or the operation of updating WLAN access selection and/or the operation of updating the network slice information and/or the operation of updating the PDU session based on the first UE policy within a first duration.

In an implementation mode, the first indication information may include a fourth indication parameter, and the fourth indication parameter is configured to instruct the UE to, responsive to determining based on the first UE policy that a PDU session presently used for a traffic descriptor in a URSP rule is in an inactive state, execute an operation of updating an association between an application data stream corresponding to the traffic descriptor and the PDU session, that the PDU session is in the inactive state referring to that no data is transmitted through the PDU session and/or a radio resource is released.

In an implementation mode, the first indication information may include a fifth indication parameter, and the fifth indication parameter is configured to instruct the UE to determine a state of a first application data stream in the URSP rule based on the first UE policy and execute an operation of updating an association between the first application data stream and a PDU session and/or the operation of updating the network slice information and/or the operation of updating the PDU session based on the state of the first application data stream.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream is the inactive state, the operation of updating the association between the first application data stream and the PDU session and/or the operation of updating the network slice information and/or the operation of updating the PDU session are/is executed. The state of the first application data stream being the inactive state refers to that the first application data stream includes no data packet or only includes a heartbeat packet at present or in a period of time.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream indicates that a rate of the first application data stream is less than or equal to a first threshold, the operation of updating the association between the first application data stream and the PDU session and/or the operation of updating the network slice information and/or the operation of updating the PDU session are/is executed.

In an implementation mode, the method further may include the following operations.

The network device may store a URSP rule and/or WLANSP rule corresponding to a present PDU session.

When the URSP rule and/or the WLANSP rule are required to be updated and when a data stream described in the URSP rule and/or WLANSP rule to be updated is in the PDU session through which data is being transmitted, updating may be not triggered or may be delayed to be triggered, and updating of another URSP rule or WLANSP rule required to be updated may be triggered.

Furthermore, a PCF may transmit an application detection event to an SMF/UPF to detect a specific application according to the URSP rule or the WLANSP rule. When the URSP rule or the WLANSP rule is required to be updated, the PCF may check whether a report about detection for the specific application is received from the SMF/UPF. If not received, the PCF may transmit an update of the URSP rule or the WLANSP rule. If received, the update of the URSP rule or the WLANSP rule temporally may not be transmitted; and after the SMF/UPF reports that the application data stream is stopped or a certain period exceeds, the PCF may transmit the update of the URSP rule or the WLANSP rule. The PCF may also obtain a state of the specific application through a notification message from a third-party application server to determine whether to update the URSP rule or the WLANSP rule.

In the embodiments of the disclosure, different indication parameters correspond to different priority information. When the first indication information includes at least two indication parameters, whether an execution condition corresponding to the indication parameter with highest priority is satisfied or satisfied within a second duration may be determined. If satisfied, the operation of updating the association between the application data stream and the PDU session and/or the operation of updating WLAN access selection and/or the operation of updating the network slice information and/or the operation of updating the PDU session are/is executed based on the indication parameter with the highest priority. If not satisfied, whether an execution condition corresponding to the indication parameter with second highest priority is satisfied or satisfied within the second duration is determined; and if satisfied, the operation of updating the association between the application data stream and the PDU session and/or the operation of updating WLAN access selection and/or the operation of updating the network slice information and/or the operation of updating the PDU session are/is executed based on the indication parameter with second highest priority.

In the embodiments of the disclosure, indication parameters in the first indication information may be different based on different PSIs; or, indication parameters in the first indication information may be different based on different URSP rules; or, indication parameters in the first indication information may be different based on different ANDSP rules; or, indication parameters in the first indication information may be different based on different RSDs.

In an implementation mode, the method may further include that: the network device sends second indication information to the UE to enable the UE to determine whether to send a response to the first UE policy to the network device based on the second indication information.

FIG. 6 is a first structure composition diagram of an apparatus for updating a UE policy according to an embodiment of the disclosure. As shown in FIG. 6, the device includes a first receiving unit 601 and an updating unit 602.

The first receiving unit 601 is configured to receive a first UE policy and/or first indication information from a network device.

The updating unit 602 is configured to execute an operation of updating an association between an application data stream and a PDU session and/or an operation of updating WLAN access selection and/or an operation of updating network slice information and/or an operation of updating a PDU session based on the first UE policy and/or the first indication information.

In an implementation mode, in response to that a UE policy of UE is updated, the first receiving unit 601 is configured to receive the first UE policy and/or the first indication information from the network device, the first UE policy being a UE policy to be updated.

In an implementation mode, in response to that the UE is handed over, the UE policy of the UE may be updated.

In an implementation mode, under a condition that the UE is executing a data service, the updating unit 602 may be configured to execute the operation of updating the association between the application data stream and the PDU session and/or the operation of updating WLAN access selection and/or the operation of updating the network slice information and/or the operation of updating the PDU session based on the first UE policy and/or the first indication information.

In an implementation mode, the first indication information may include a first indication parameter, and the first indication parameter is configured to instruct the UE to, after entering an idle state, execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a second indication parameter, and the second indication parameter is configured to instruct the UE to, after receiving the first indication information, immediately execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a third indication parameter, and the third indication parameter is configured to instruct the UE to, after receiving the first indication information, execute the operation of updating the association between the application data stream and the PDU session and/or the operation of updating WLAN access selection and/or the operation of updating the network slice information and/or the operation of updating the PDU session based on the first UE policy within a first duration.

In an implementation mode, the updating unit 602 is configured to:

in response to that the UE enters an idle state during the first duration, execute the operation of updating the association between the application data stream and the PDU session and/or the operation of updating WLAN access selection and/or the operation of updating the network slice information and/or the operation of updating the PDU session based on the first UE policy; and in response to that the UE is in a connected state during the first duration, execute the operation of updating the association between the application data stream and the PDU session and/or the operation of updating WLAN access selection and/or the operation of updating the network slice information and/or the operation of updating the PDU session based on the first UE policy.

In an implementation mode, the device may further include a state control unit 603.

The state control unit 603 is configured to, in response to that the UE is in the connected state during the first duration and is transmitting data, stop transmitting the data and return to the idle state from the connected state.

In an implementation mode, the device may further include a state control unit 603.

The state control unit 603 is configured to, in response to that the UE is in the connected state during the first duration, release an RRC connection or a NAS connection under control of the network device to return to the idle state from the connected state.

In an implementation mode, the operation that the operation of updating the association between the application data stream and the PDU session is executed may include that: an original application data stream is bound to a PDU session matching with an updated rule, the updated rule being a rule in the first UE policy.

In an implementation mode, the first indication information may include a fourth indication parameter, and the fourth indication parameter is configured to instruct the UE to, responsive to determining based on the first UE policy that a PDU session presently used for a traffic descriptor in a URSP rule is in an inactive state, execute an operation of updating an association between an application data stream corresponding to the traffic descriptor and the PDU session. The PDU session being in the inactive state refers to that no data is transmitted through the PDU session and/or a radio resource is released.

Furthermore, the operation that the operation of updating the association between the application data stream corresponding to the traffic descriptor and the PDU session is executed may include that: a new PDU session is established or a modification is initiated for an existing PDU session, and the application data stream corresponding to the traffic descriptor is bound to the new or modified PDU session.

In an implementation mode, the first indication information may include a fifth indication parameter, and the fifth indication parameter is configured to instruct the UE to determine a state of a first application data stream in the URSP rule based on the first UE policy and execute an operation of updating an association between the first application data stream and a PDU session and/or the operation of updating the network slice information and/or the operation of updating the PDU session based on the state of the first application data stream.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream is the inactive state, the operation of updating the association between the first application data stream and the PDU session and/or the operation of updating the network slice information and/or the operation of updating the PDU session are/is executed, that the state of the first application data stream is the inactive state referring to that the first application data stream includes no data packet or only includes a heartbeat packet at present or in a period of time.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream indicates that a rate of the first application data stream is less than or equal to a first threshold, the operation of updating the association between the first application data stream and the PDU session and/or the operation of updating the network slice information and/or the operation of updating the PDU session are/is executed.

In the embodiments of the disclosure, different indication parameters correspond to different priority information. When the first indication information includes at least two indication parameters, whether an execution condition corresponding to the indication parameter with highest priority is satisfied or satisfied within a second duration is determined. If satisfied, the operation of updating the association between the application data stream and the PDU session and/or the operation of updating WLAN access selection and/or the operation of updating the network slice information and/or the operation of updating the PDU session are/is executed based on the indication parameter with the highest priority. If not satisfied, whether an execution condition corresponding to the indication parameter with second highest priority is satisfied or satisfied within the second duration is determined; and if satisfied, the operation of updating the association between the application data stream and the PDU session and/or the operation of updating WLAN access selection and/or the operation of updating the network slice information and/or the operation of updating the PDU session are/is executed based on the indication parameter with second highest priority.

In an implementation mode, the updating unit 602 is configured to, based on the first UE policy, modify a present first PDU session for the application data stream to a second PDU session satisfying a target condition and bear the application data stream in the second PDU session, and/or, based on the first UE policy, modify a present first WLAN connection of the UE to a second WLAN connection satisfying the target condition and bear a data stream of the first WLAN connection through the second WLAN connection.

In an implementation mode, the updating unit 602 is configured to, based on the first UE policy, establish a second PDU session satisfying a target condition for the application data stream and bear the application data stream in the second PDU session, and/or, based on the first UE policy, establish a second WLAN connection satisfying a target condition for the UE and bear a data stream of a first WLAN connection through the second WLAN connection.

In an implementation mode, the updating unit 602 is further configured to, after the application data stream is born in the second PDU session, delete an original first PDU session for the application data stream, and/or, after a data stream of a first WLAN connection is born through a second WLAN connection, delete the first WLAN connection.

In an implementation mode, the updating unit 602 is further configured to, when the first receiving unit 601 does not receive the first indication information, determine a target indication parameter based on first information and execute an updating operation corresponding to the target indication parameter. The target indication parameter may be one of the first indication parameter in the first indication information, the second indication parameter in the first indication information, the third indication parameter in the first indication information, the fourth indication parameter in the first indication information and the fifth indication parameter in the first indication information.

In an implementation mode, when a PSI or RSD or URSP or first UE policy received by the first receiving unit 601 contains the target indication parameter, an updating operation corresponding to the target indication parameter may be executed.

When the PSI or RSD or URSP or first UE policy received by the first receiving unit 601 does not contain the target indication parameter, an updating operation corresponding to a default indication parameter may be executed.

The default indication parameter may be one of the first indication parameter, the second indication parameter, the third indication parameter, the fourth indication parameter and the fifth indication parameter.

In an implementation mode, the first UE policy may be divided into multiple parts, different parts may have different serial numbers, different serial number ranges may correspond to different indication parameters, and the UE may store a corresponding relationship between a serial number range and an indication parameter.

After the first receiving unit 601 receives a first rule in the first UE policy, an indication parameter corresponding to the first rule may be determined based on a serial number of the first rule and the stored corresponding relationship between the serial number range and the indication parameter, and a corresponding updating operation may be executed.

In an implementation mode, after the first receiving unit 601 receives the first UE policy, a presently stored UE policy may be updated based on the first UE policy, and an ACK message may be sent to the network device.

In an implementation mode, when the UE does not have a new rule ID at present, the new rule ID and a corresponding content are added; when a rule ID presently stored in the UE is as same as the new rule ID and a new rule with the new rule ID includes a specific content, the stored rule ID and a corresponding content may be replaced; and when the rule ID presently stored in the UE is as same as the new rule ID and the new rule includes the new rule ID only, the stored rule ID and content may be deleted.

In an implementation mode, in a process of updating with the first UE policy, for a replaced UE policy, an updating operation may be executed according to an indication parameter corresponding to the replaced UE policy, or an updating operation may be executed according to an indication parameter corresponding to a newly released UE policy. The replaced UE policy refers to a UE policy that has been locally stored but is deleted due to updating with the first UE policy.

In an implementation mode, in the process of updating with the first UE policy, the replaced UE policy may be changed from an original UE policy to a new UE policy. A traffic descriptor of the original UE policy may correspond to a first range and a traffic descriptor of the new UE policy may correspond to a second range. An updating operation may be executed for an application data stream corresponding to an overlapping range of the first range and the second range based on the new UE policy or the original UE policy.

In an implementation mode, the UE may bind the application data stream by a first RSD under a first rule and/or a first WLANSP rule. In response to the UE subsequently determines that a second URSP rule satisfying a specified condition and/or a second RSD under a first URSP rule and/or a second WLANSP rule are/is available, the UE may determine timing of executing a following operation according to the indication parameter in the first indication information: binding an application data stream described by a traffic descriptor corresponding to the second URSP rule satisfying the specified condition and/or the second RSD under the first URSP rule and/or the second WLANSP rule to the second URSP rule satisfying the specified condition and/or the second RSD under the first URSP rule and/or the second WLANSP rule.

In an implementation mode, an indication parameter may be added to subscription information or policy information, and the indication parameter is configured to indicate an action of the UE after receiving an updated URSP rule and/or WLANSP rule. The action refers to immediately performing association updating, or performing association updating when the PDU session is not in an active state, or performing association updating in certain time.

In an implementation mode, when the updated URSP rule and/or WLANSP rule are/is received, whether an impacted service data stream is presently in a PDU session through which data is being transmitted is determined, and if YES, an indication parameter corresponding to the PDU session may be determined and timing for association updating may be determined based on the indication parameter.

In an implementation mode, the operation that the operation of updating the association between the application data stream and the PDU session and/or the operation of updating WLAN access selection and/or the operation of updating the network slice information and/or the operation of updating the PDU session are/is executed may include the following operations.

When the application data stream is being transmitted, the operation of updating the association between the application data stream and the PDU session and/or the operation of updating WLAN access selection and/or the operation of updating the network slice information and/or the operation of updating the PDU session are/is not executed.

After transmission of the application data stream is ended, the operation of updating the association between the application data stream and the PDU session and/or the operation of updating WLAN access selection and/or the operation of updating the network slice information and/or the operation of updating the PDU session are/is executed when transmission is started next time.

In an implementation mode, indication parameters in the first indication information may be different based on different PSIs; or, indication parameters in the first indication information may be different based on different URSP rules; or, indication parameters in the first indication information may be different based on different ANDSP rules; or, indication parameters in the first indication information may be different based on different RSDs.

In an implementation mode, the device may further include a second receiving unit 604 and a responding unit 605.

The second receiving unit 604 is configured to receive second indication information from the network device and a responding unit.

The responding unit 605 is configured to determine whether to send a response to the first UE policy to the network device based on the second indication information.

Those skilled in the art should know that functions realized by each unit in the apparatus for updating a UE policy as shown in FIG. 6 may be understood with reference to related descriptions about the method for updating a UE policy. The functions of each unit in the apparatus for updating a UE policy as shown in FIG. 9 may be realized through a program running in a processor, and may also be realized through a specific logical circuit.

FIG. 7 is a second structure composition diagram of an apparatus for updating a UE policy according to an embodiment of the disclosure. As shown in FIG. 7, the device includes a first sending unit 701.

The first sending unit 701 is configured to send a first UE policy and/or first indication information to UE to enable the UE to execute an operation of updating an association between an application data stream and a PDU session and/or an operation of updating WLAN access selection and/or an operation of updating network slice information and/or an operation of updating a PDU session based on the first UE policy and/or the first indication information.

In an implementation mode, in response to that a UE policy of the UE is updated, the first sending unit 701 may send the first UE policy and the first indication information to the UE, the first UE policy being a UE policy to be updated.

In an implementation mode, in response to that the UE is handed over, the UE policy of the UE may be updated.

In an implementation mode, the first indication information may include a first indication parameter, and the first indication parameter is configured to instruct the UE to, after entering an idle state, execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a second indication parameter, and the second indication parameter is configured to instruct the UE to, after receiving the first indication information, immediately execute the operation of updating the association between the application data stream and the PDU session and/or the operation of updating WLAN access selection and/or the operation of updating the network slice information and/or the operation of updating the PDU session based on the first UE policy.

In an implementation mode, the first indication information may include a third indication parameter, and the third indication parameter is configured to instruct the UE to, after receiving the first indication information, execute the operation of updating the association between the application data stream and the PDU session and/or the operation of updating WLAN access selection and/or the operation of updating the network slice information and/or the operation of updating the PDU session based on the first UE policy within a first duration.

In an implementation mode, the first indication information may include a fourth indication parameter, and the fourth indication parameter is configured to instruct the UE to, responsive to determining based on the first UE policy that a PDU session presently used for a traffic descriptor in a URSP rule is in an inactive state, execute an operation of updating an association between an application data stream corresponding to the traffic descriptor and the PDU session. The PDU session being in the inactive state refers to that no data is transmitted through the PDU session and/or a radio resource is released.

In an implementation mode, the first indication information may include a fifth indication parameter, and the fifth indication parameter is configured to instruct the UE to determine a state of a first application data stream in the URSP rule based on the first UE policy and execute an operation of updating an association between the first application data stream and a PDU session and/or the operation of updating the network slice information and/or the operation of updating the PDU session based on the state of the first application data stream.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream is the inactive state, the operation of updating the association between the first application data stream and the PDU session and/or the operation of updating the network slice information and/or the operation of updating the PDU session are/is executed. The state of the first application data stream being the inactive state refers to that the first application data stream includes no data packet or only includes a heartbeat packet at present or in a period of time.

Furthermore, the operation that the operation of updating the association between the first application data stream and the PDU session and/or the operation of updating the network slice information and/or the operation of updating the PDU session are/is executed based on the state of the first application data stream may include the following operation.

In response to that the state of the first application data stream indicates that a rate of the first application data stream is less than or equal to a first threshold, the operation of updating the association between the first application data stream and the PDU session and/or the operation of updating the network slice information and/or the operation of updating the PDU session are/is executed.

In the embodiments of the disclosure, different indication parameters may correspond to different priority information. When the first indication information includes at least two indication parameters, whether an execution condition corresponding to the indication parameter with highest priority is satisfied or satisfied within a second duration is determined. If satisfied, the operation of updating the association between the application data stream and the PDU session and/or the operation of updating WLAN access selection and/or the operation of updating the network slice information and/or the operation of updating the PDU session are/is executed based on the indication parameter with the highest priority. If not satisfied, whether an execution condition corresponding to the indication parameter with second highest priority is satisfied or satisfied within the second duration is determined; and if satisfied, the operation of updating the association between the application data stream and the PDU session and/or the operation of updating WLAN access selection and/or the operation of updating the network slice information and/or the operation of updating the PDU session are/is executed based on the indication parameter with second highest priority.

In an implementation mode, a network device may store a URSP rule and/or a WLANSP rule corresponding to a present PDU session. When the URSP rule and/or the WLANSP rule are required to be updated, if data of a data stream described in the URSP rule and/or WLANSP rule to be updated is being transmitted through the PDU session, updating may be not triggered or may be delayed to be triggered, and updating of another URSP rule or WLANSP rule required to be updated may be triggered.

In an implementation mode, a PCF may transmit an application detection event to an SMF/UPF according to the URSP rule or the WLANSP rule to detect a specific application. When the URSP rule or the WLANSP rule is required to be updated, the PCF may check whether a report about detection for the specific application is received from the SMF/UPF. If not received, the PCF may transmit an update of the URSP rule or the WLANSP rule. If received, the update of the URSP rule or the WLANSP rule temporally may be not transmitted; and after the SMF/UPF reports that the application data stream is stopped or a certain period exceeds, the PCF may transmit the update of the URSP rule or the WLANSP rule. The PCF may also obtain a state of the specific application through a notification message from a third-party application server to determine whether to update the URSP rule or the WLANSP rule.

In an implementation mode, indication parameters in the first indication information may be different based on different PSIs; or, indication parameters in the first indication information may be different based on different URSP rules; or, indication parameters in the first indication information may be different based on different ANDSP rules; or, indication parameters in the first indication information may be different based on different RSDs.

In an implementation mode, the device may further include a second sending unit 702.

The second sending unit 702 is configured to send second indication information to the UE to enable the UE to determine whether to send a response to the first UE policy to the network device based on the second indication information.

Those skilled in the art should know that functions realized by each unit in the apparatus for updating a UE policy shown in FIG. 7 may be understood with reference to related descriptions about the method for updating a UE policy. The functions of each unit in the apparatus for updating a UE policy shown in FIG. 9 may be realized through a program running in a processor, and may also be realized through a specific logical circuit.

When being implemented in form of software functional module and sold or used as an independent product, the apparatus for updating a UE policy in the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which computer-executable instructions are stored, the computer-executable instructions being executable by a processor to implement the method for updating a UE policy in the embodiments of the disclosure.

Figure 8:
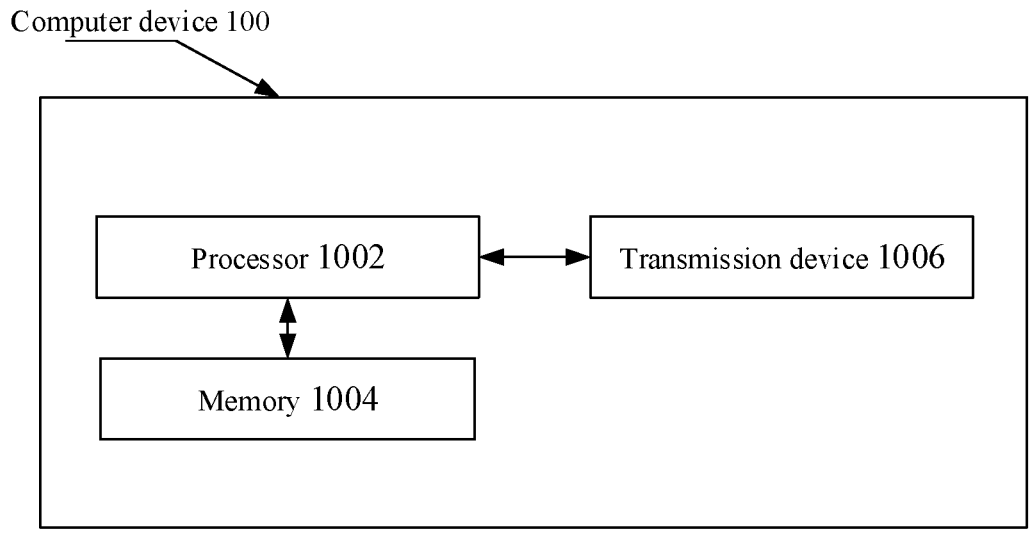
FIG. 8 is a structure composition diagram of a computer device according to an embodiment of the disclosure.

FIG. 8 is a structure diagram of a computer device according to an embodiment of the disclosure. The computer device may be UE or a network device. As shown in FIG. 8, the computer device 100 may include one or more (only one is illustrated in the figure) processors 1002 (the processor 1002 may include, but not limited to, a processing device such as a Micro Controller Unit (MCU) or a Field Programmable Gate Array (FPGA)), a memory 1004 configured to store data and a transmission device 1006 configured for a communication function. Those of ordinary skill in the art should know that the structure shown in FIG. 8 is only schematic and not intended to limit the structure of the electronic device. For example, the computer device 100 may further include components more or fewer than the components shown in FIG. 8 or has a configuration different from that shown in FIG. 8.

The memory 1004 may be configured to store a software program of application software and a module, for example, a program instruction/module corresponding to a method in the embodiments of the disclosure. The processor 1002 may run the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In the technical solutions of the embodiments of the disclosure, UE receives a first UE policy and/or first indication information from a network device; and the UE executes an operation of updating an association between an application data stream and a PDU session and/or an operation of updating WLAN access selection and/or an operation of updating the network slice information and/or an operation of updating a PDU session based on the first UE policy and/or the first indication information. With adoption of the technical solutions of the embodiments of the disclosure, time for executing the operation of updating the association between the application data stream and the PDU session and/or the operation of updating WLAN access selection may be indicated through the first indication information, namely the UE may precisely execute the related updating operation according to the first UE policy, so that the service continuity is ensured.

In some embodiments provided by the disclosure, it is to be understood that the disclosed methods and intelligent apparatuses may be implemented in another manner. The apparatus embodiments described above are only schematic. For example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may be or may not be physically separated. Parts displayed as units may be or may not be physical units, namely, may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for updating a User Equipment (UE) policy, implemented by UE, the method comprising:
receiving an updated UE Route Selection Policy (URSP) rule;
determining an updated association between an application data stream and a Protocol Data Unit (PDU) session according to the updated URSP rule; and
performing updating of an existing association between the application data stream and the PDU session based on the updated association in a manner by:
performing the updating of the existing association or not based on whether the PDU session is in an active state, wherein the updating of the existing association is performed responsive to determining that the PDU session is in an inactive state, and the PDU session being in the inactive state refers to that no data is transmitted through the PDU session and/or the radio resource is released,
wherein the method further comprises:
receiving a URSP and first indication information from a network device; and
updating the existing association based on the first indication information, wherein the first indication information comprises an indication parameter, and the indication parameter is configured to instruct the UE to, responsive to determining based on a first UE policy that a PDU session corresponding to a traffic descriptor in a URSP rule is in the inactive state, perform updating of an association between an application data stream corresponding to the traffic descriptor and the PDU session.

2. The method of claim 1, further comprising:
receiving a URSP from a network device; and
updating the existing association based on default configuration information.

3. The method of claim 1, wherein the first indication information further comprises a first indication parameter, and the first indication parameter is configured to instruct the UE to, after entering an idle state, perform the updating of the existing association between the PDU session and the application data stream.

4. The method of claim 1, wherein the first indication information further comprises a second indication parameter, and the second indication parameter is configured to instruct the UE to, after receiving the first indication information, immediately perform the updating of the existing association between the PDU session and the application data stream.

5. The method of claim 1, further comprising:
receiving second indication information from a network device; and
determining whether to send a response to the UE policy to the network device based on the second indication information.

6. The method of claim 1, further comprising:
modifying, based on the first UE policy, a present first PDU session for the application data stream to a second PDU session satisfying a target condition; and
deleting the present first PDU session for the application data stream after the application data stream is born in the second PDU session.

7. An apparatus for updating a User Equipment (UE) policy of UE, applicable to a UE, the apparatus comprising:
a transmission device, configured to receive an updated UE Route Selection Policy (URSP) rule; and
a processor, connected to the transmission device, and configured to:
determine an updated association between an application data stream and a Protocol Data Unit (PDU) session according to the updated URSP rule; and
perform updating of an existing association between the application data stream and the PDU session based on the updated association in a manner by:
performing the updating of the existing association or not based on whether the PDU session is in an active state, wherein the updating of the existing association is performed responsive to determining that the PDU session is in an inactive state, and the PDU session being in the inactive state refers to that no data is transmitted through the PDU session and/or the radio resource is released,
wherein the transmission device is configured to receive a URSP and first indication information from a network device; and
the processor is configured to update the existing association based on the first indication information, wherein the first indication information comprises an indication parameter, and the indication parameter is configured to instruct the UE to, responsive to determining based on a first UE policy that a PDU session corresponding to a traffic descriptor in a URSP rule is in the inactive state, perform updating of an association between an application data stream corresponding to the traffic descriptor and the PDU session.

8. The apparatus of claim 7, wherein
the transmission device is configured to receive a URSP from a network device; and
the processor is configured to update the existing association based on default configuration information.

9. The apparatus of claim 7, wherein the first indication information further comprises a first indication parameter, and the first indication parameter is configured to instruct the UE to, after entering an idle state, perform the updating of the existing association between the PDU session and the application data stream.

10. The apparatus of claim 7, wherein the first indication information further comprises a second indication parameter, and the second indication parameter is configured to instruct the UE to, after receiving the first indication information, immediately perform the updating of the existing association between the PDU session and the application data stream.

11. The apparatus of claim 7, wherein
the transmission device is configured to receive second indication information from a network device; and
the processor is configured to determine whether to send a response to the UE policy to the network device based on the second indication information.

12. The apparatus of claim 7, further comprising:
an updating unit, configured to modify, based on the first UE policy, a present first PDU session for the application data stream to a second PDU session satisfying a target condition; and
delete the present first PDU session for the application data stream after the application data stream is born in the second PDU session.

13. An apparatus for updating a User Equipment (UE) policy of UE, applicable to a network device, the apparatus comprising:
a transmission device, configured to send an updated UE Route Selection Policy (URSP) rule to the UE to enable the UE to determine an updated association between an application data stream and a Protocol Data Unit (PDU) session and update an existing association between the application data stream and the PDU session based on the updated association in a manner by:
performing the updating of the existing association or not based on whether the PDU session is in an active state, wherein the updating of the existing association is performed responsive to determining that the PDU session is in an inactive state, and the PDU session being in the inactive state refers to that no data is transmitted through the PDU session and/or the radio resource is released,
wherein the transmission device is configured to send a URSP and first indication information to the UE to enable the UE to update the existing association based on the first indication information, wherein the first indication information comprises an indication parameter, and the indication parameter is configured to instruct the UE to, responsive to determining based on a first UE policy that a PDU session corresponding to a traffic descriptor in a URSP rule is in the inactive state, perform updating of an association between an application data stream corresponding to the traffic descriptor and the PDU session.

14. The apparatus of claim 13, wherein
the transmission device is configured to send a URSP to the UE to enable the UE to update the existing association based on default configuration information.

15. The apparatus of claim 13, wherein the first indication information further comprises a first indication parameter, and the first indication parameter is configured to instruct the UE to, after entering an idle state, perform the updating of the existing association between the PDU session and the application data stream.

16. The apparatus of claim 13, wherein the first indication information further comprises a second indication parameter, and the second indication parameter is configured to instruct the UE to, after receiving the first indication information, immediately perform the updating of the existing association between the PDU session and the application data stream.

17. The apparatus of claim 13, wherein the transmission device is configured to:
send second indication information to the UE; and
receive a response to the UE policy from the UE, where the response is determined to be sent by the UE based on the second indication information.

18. The apparatus of claim 13, further comprising:
an updating unit, configured to modify, based on the first UE policy, a present first PDU session for the application data stream to a second PDU session satisfying a target condition; and delete the present first PDU session for the application data stream after the application data stream is born in the second PDU session.

\* \* \* \* \*